United States Patent
Tonogai et al.

[11] Patent Number: 5,525,955
[45] Date of Patent: Jun. 11, 1996

[54] CAPACITOR COUPLED POTENTIOMETER

[75] Inventors: Yoshihide Tonogai; Masaaki Takagi, both of Itabashi-ku, Japan

[73] Assignee: Copal Company Limited, Tokyo, Japan

[21] Appl. No.: 211,361

[22] PCT Filed: Nov. 10, 1993

[86] PCT No.: PCT/JP93/01643

§ 371 Date: Mar. 30, 1994

§ 102(e) Date: Mar. 30, 1994

[87] PCT Pub. No.: WO94/11888

PCT Pub. Date: May 26, 1994

[30] Foreign Application Priority Data

Nov. 10, 1992 [JP] Japan ................ 4-077401 U
Nov. 10, 1992 [JP] Japan ................ 4-300136
Nov. 10, 1992 [JP] Japan ................ 4-300137

[51] Int. Cl.$^6$ ................................... H01C 10/00
[52] U.S. Cl. ................ 338/185; 338/75; 338/92; 338/140; 338/173; 338/178; 338/187; 338/188; 338/189; 338/202
[58] Field of Search ................ 338/75, 92, 140, 338/173, 178, 185, 187, 188, 189, 202; 361/277, 278, 279, 287

[56] References Cited

U.S. PATENT DOCUMENTS

| | | | |
|---|---|---|---|
| 3,671,854 | 6/1972 | Masuda | 338/32 H |
| 3,988,710 | 10/1976 | Sidor et al. | 338/32 R |
| 4,274,074 | 6/1981 | Sakamoto | 338/160 |
| 5,231,508 | 7/1993 | Murphy, Jr. | 338/32 H |

FOREIGN PATENT DOCUMENTS 60-11601  4/1985  Japan .............. H01C 10/00

*Primary Examiner*—Teresa J. Walberg
*Assistant Examiner*—Karl D. Easthom
*Attorney, Agent, or Firm*—Hickman Beyer & Weaver

[57] ABSTRACT

An annular resistor member having two non-contact ends is overlaid and adhered on the surface of a base, and a rotational shaft located at the central portion of the resistor member is pivotally axially supported via a bearing. A bent electrode arm is fitted on the rotational shaft, and is connected to an output terminal via the rotational shaft or a connection means. A movable electrode, which opposes to the resistor member via a gap, is integrally formed on the end portion of the electrode arm, and a capacitor is formed between the movable electrode and the resistor member. In the above structure, when an AC power supply is flowed across the two ends of the resistor member, the capacitor is formed between the movable electrode and the resistor member, and an attenuated voltage is generated on the movable electrode. The voltage generated on the movable electrode increases/decreases in accordance with the displacement of the movable electrode upon rotation of the rotational shaft, and when this voltage is extracted as a resistance dividing ratio from the output terminal, the rotational angle or displacement amount of the rotational shaft can be detected.

25 Claims, 12 Drawing Sheets

CAPACITOR COUPLED POTENTIOMETER

TECHNICAL FIELD

The present invention relates to a potentiometer used in automatic control and the like.

BACKGROUND ART

As sensors for a feedback use in an automatic control system, for example, sensors for detecting the absolute values (analog amounts) of a rotational angle and a displacement amount are known, and a typical one of these sensors is a potentiometer. The potentiometer is classified into a contact type shown in FIGS. 1 and 2, and a non-contact type shown in FIGS. 3 and 4.

As shown in FIGS. 1 and 2, a contact type potentiometer comprises a circular base 2 fixed with a cylindrical wall 2a to the inner surface of which a resistor member 1 is adhered. A rotational shaft 4 is supported by the circular base 2. A brush 7 is attached to the rotational shaft 4 via a movable arm 6, and a slip ring 8 is fixed to the rotational shaft 4. A V-shaped conductive wire 9 is connected to an output terminal 10, and slidably contacts with a recess groove 8a formed by notching the slip ring 8.

The resistor member 1 consists of a metal resistor or conductive plastic to have a C-shaped cross-section, and its two terminals are respectively connected to input terminals 3.3. The rotational shaft 4 is pivotally supported on the bottom portion of the base 2 via a bearing 5, and is located at the central portion of the resistor member 1. The brush 7 is attached to the distal end of the movable arm 6, and slidably contacts with the inner circumferential surface of the resistor member 1. The movable arm 6 and the slip ring 8 located above the arm 6 are electrically connected to each other via the rotational shaft 4.

The above-mentioned contact type potentiometer is used by applying a DC voltage across the input terminals 3.3. When the brush 7 rotates and is displaced together with the rotational shaft 4, the voltage from the output terminal 10 changes. More specifically, the absolute value of the voltage dividing ratio of the DC voltage by the resistor member 1 is obtained in accordance with the position of the brush 7, and hence, the absolute value of the rotational angle or the displacement amount of the rotational shaft 4 can be detected.

This potentiometer is not influenced by a change in temperature, and can be used in an environment in a wide temperature range from −40° C. to +150° C. since it detects the position of the brush 7 using the voltage dividing ratio of the DC voltage in accordance with the resistance dividing ratio of the resistor member 1. However, detection precision is impaired due to wear of the resistor member 1 by the brush 7, and the service life of the potentiometer is shortened. In addition, a torque upon sliding is undesirably large.

In order to prolong the service life, a potentiometer including a non-contact detection portion is proposed. As shown in FIGS. 3 and 4, this potentiometer comprises a disk-shaped base 2 having a cylindrical wall 2a, and two magnetoresistive elements 11.11 are arranged on the base 2.

The two magnetic resistance elements 11.11 are designed to have a substantially semi-arcuated shape, and are arranged on the bottom portion of the base 2 to have a common center of curvature. These two magnetic resistance elements 11.11 are commonly connected to an output terminal 10 via a conductive wire. Input terminals 3.3 are respectively connected to the end portions of these elements 11.11 via conductive wires.

A rotational shaft 4 is pivotally inserted in the bottom portion of the base 2 via a bearing 5, and is located at the center of curvature of the two magnetic resistance elements 11.11. Furthermore, a permanent magnet 13 having a substantially semi-circular shape is attached as a magnetic field generating source to the circumferential surface of the rotational shaft 4, and opposes to the two magnetic resistance elements 11.11 via gaps. The permanent magnet 13 rotates in an facing state to the two magnetic resistance elements 11.11 via gaps upon rotation of the rotational shaft 4, thereby changing the amount of a magnetic field applied to the two magnetic resistance elements 11.11.

The above-mentioned potentiometer is used by applying a DC voltage across the input terminals 3.3. The potentiometer also utilizes a change in internal resistance of the magnetic resistance elements 11.11 upon application of a magnetic field to the magnetic resistance elements 11.11. More specifically, when the permanent magnet 13 rotates, the amount of a magnetic field applied to the magnetic resistance elements 11.11 facing to the permanent magnet 13 changes, and the resistances of the elements 11.11 increase/decrease accordingly. The potential of the output terminal 10 changes due to such increase/decrease in resistance, and hence, the position of the permanent magnet 13 is determined.

This non-contact type potentiometer has a long service life since the detection portion does not suffer from mechanical deterioration. However, the magnetic characteristics of the permanent magnet 13 easily deteriorate due to a change over time, resulting in a problem of detection precision. Furthermore, since the magnetic resistance elements 11.11 comprising semiconductors have poor temperature characteristics, temperature compensation must be taken into consideration when the potentiometer is used in a wide temperature range.

In order to realize accurate automatic control even in a harsh environment, it is important to widen the applicable temperature range of a potentiometer as a sensor for detecting the absolute value of a rotational angle or a displacement amount, and to prolong the service life of the potentiometer. However, in the potentiometer including the mechanical contact type detection portion, the temperature range can be widened, but it is difficult to prolong the service life. In contrast to this, in the potentiometer including the non-contact type detection portion, the service life can be prolonged, but it is difficult to widen the temperature range. Thus, both of these potentiometers have merits and demerits.

DISCLOSURE OF INVENTION

It is an object of the present invention to provide a potentiometer which can simultaneously realize a wide applicable temperature range and a long service life.

The potentiometer of the present invention comprises a resistor member having two terminals across which a predetermined AC voltage is applied, and a movable electrode which is displaced between the two terminals along the resistor member while facing the resistor member to have a predetermined interval therebetween, and is characterized in that an AC voltage corresponding to a dividing ratio of the resistor member by the movable electrode is output from the movable electrode via a resistance dividing capacitor formed by the movable electrode and the resistor member facing the movable electrode.

The characteristic features of the present invention can be summarized as follows. The first characteristic feature is application of an AC voltage across the two terminals of the resistor member, and is different in this respect from both the conventional contact and non-contact type potentiometers. The second characteristic feature is that the resistor member and the movable electrode are arranged not to directly contact each other. With this arrangement, the drawback of the conventional contact type potentiometer, i.e., mechanical deterioration due to wear, can be removed. Note that an insulator layer may be inserted between the resistor member and the movable electrode, and in this case, the insulator layer and the resistor member, or the insulator layer and the movable member rub against each other. However, as a material of the insulator layer, since a material which has a sufficiently higher wear resistance than those of the materials of the resistor member and the movable electrode, and can form a smooth surface, can be selected, almost no mechanical deterioration due to wear occurs. The conventional contact type potentiometer requires a contact state with a relatively high pressing force so as to attain DC electrical conduction. However, according to the present invention, since a predetermined interval need only be maintained between the resistor member and the movable electrode, the pressing force to the insulator layer can be low. Therefore, almost no wear occurs. The third characteristic feature is that the capacitor is constituted by the movable electrode and the resistor member, and the movable electrode and the resistor member immediately below the movable electrode are AC-electrically connected to each other via the capacitor. Therefore, an AC voltage applied to the resistor member is divided and output at the position of the movable electrode. Since the position of the movable electrode is detected by voltage division by the resistance of the AC voltage, an error caused by a change in resistance of the resistor member due to a change in temperature can be ignored, and the applicable temperature range can be widened as compared to the conventional non-contact type potentiometer.

BEST MODE OF CARRYING OUT THE INVENTION

Figure 1:
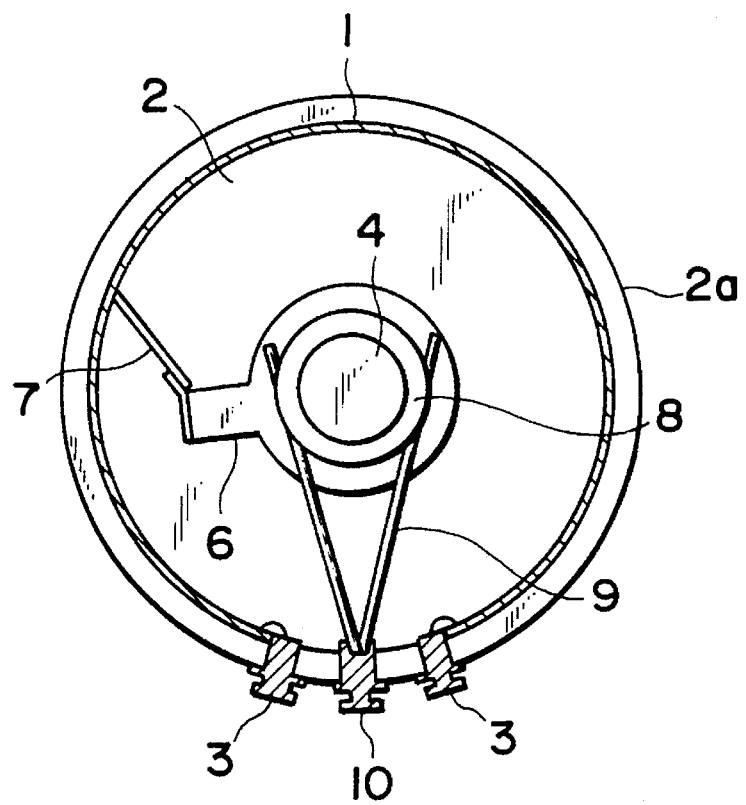
FIG. 1 is a cross-sectional explanatory view showing a conventional contact type potentiometer.
Figure 2:
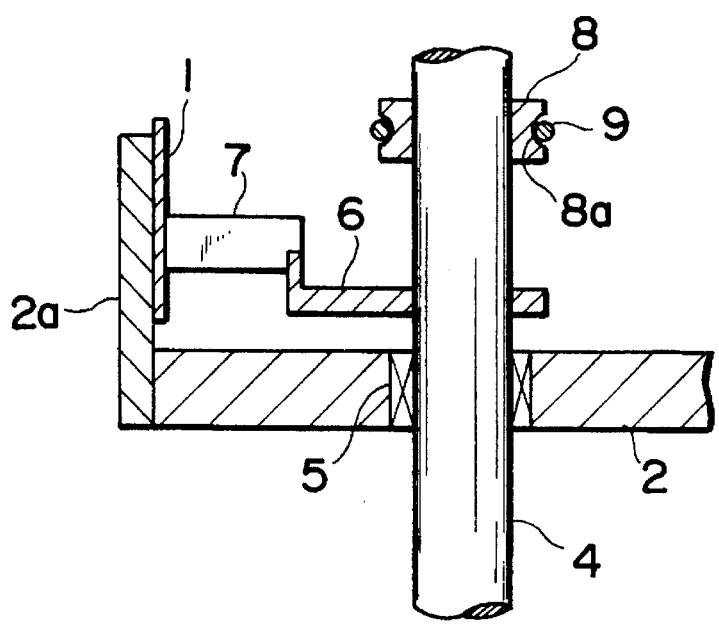
FIG. 2 is a partial longitudinal sectional view of the potentiometer shown in FIG. 1.
Figure 3:
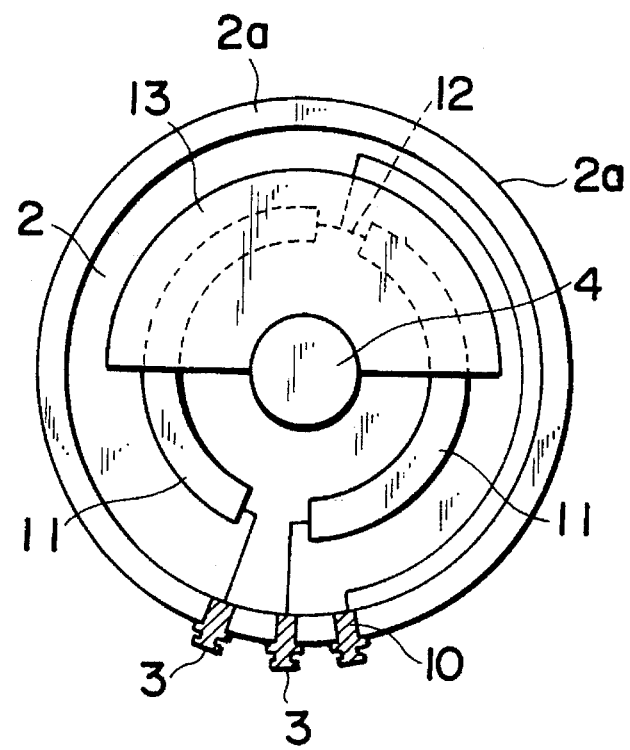
FIG. 3 is a cross-sectional explanatory view showing a conventional non-contact type potentiometer.
Figure 4:
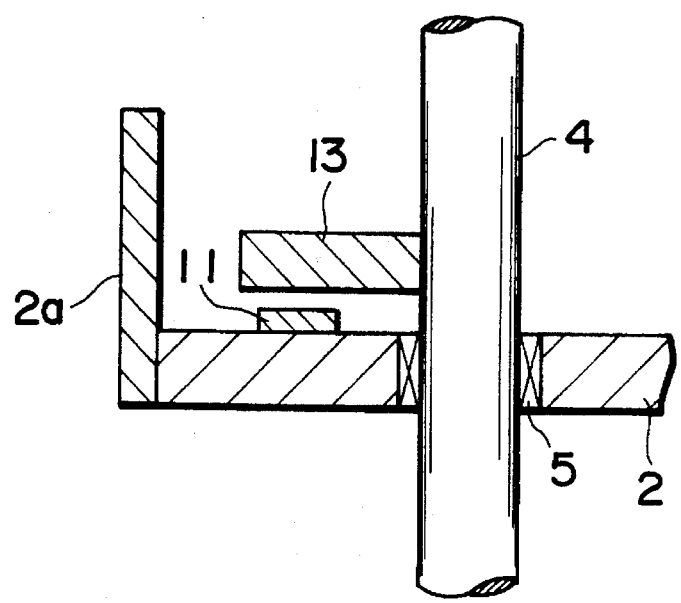
FIG. 4 is a partial longitudinal sectional view of the potentiometer shown in FIG. 3.
Figure 5:
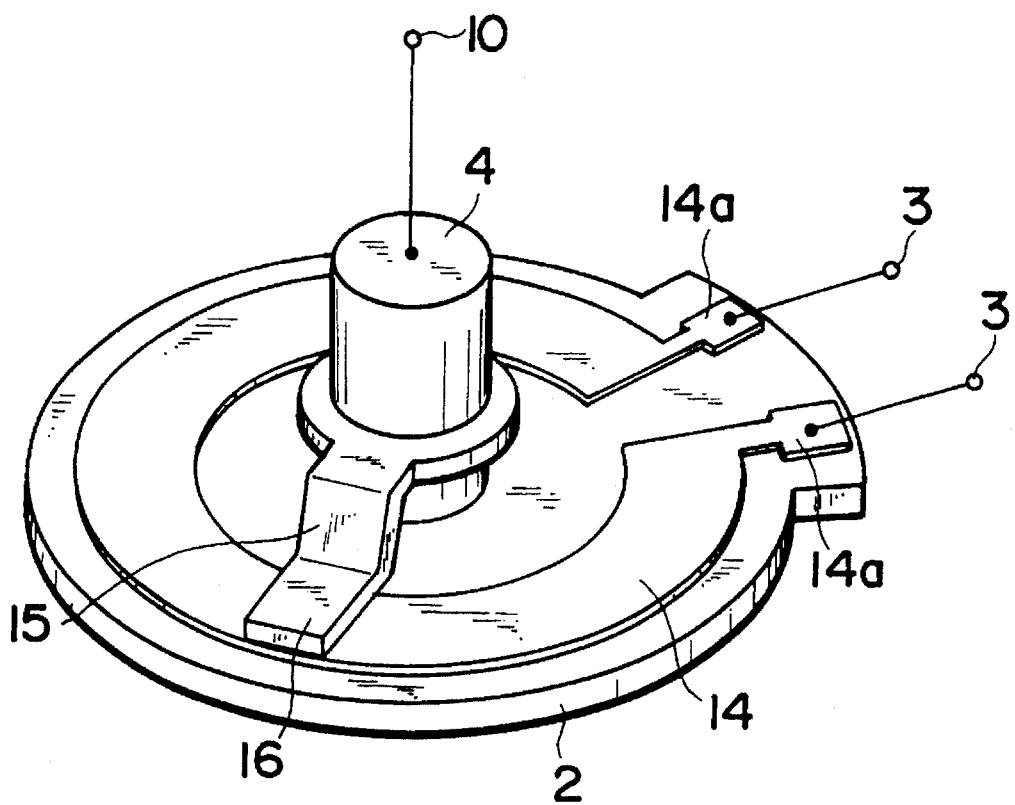
FIG. 5 is a perspective view showing a potentiometer according to the first embodiment of the present invention.
Figure 7:
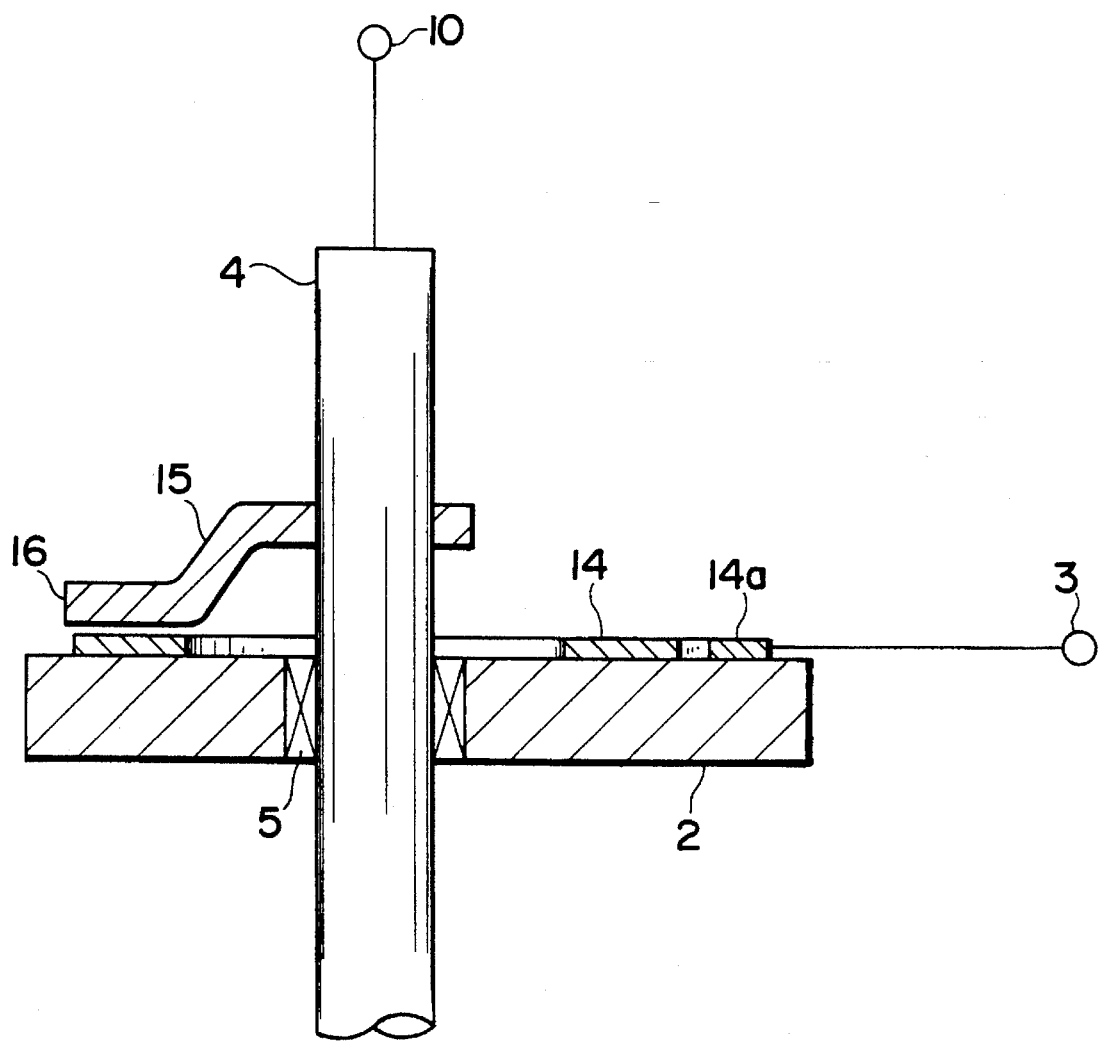
FIG. 7 is a longitudinal sectional explanatory view of the potentiometer in FIG. 5.

As shown in FIGS. 5 and 7, in the first embodiment, a planar resistor member 14 consisting of an annular resistor material having two non-contact ends is adhered on the upper surface of a substantially circular base 2 as an insulating support member, and input terminals 3,3 of an AC power supply are respectively connected to two end portions 14a,14a of the resistor member 14.

Figure 6:
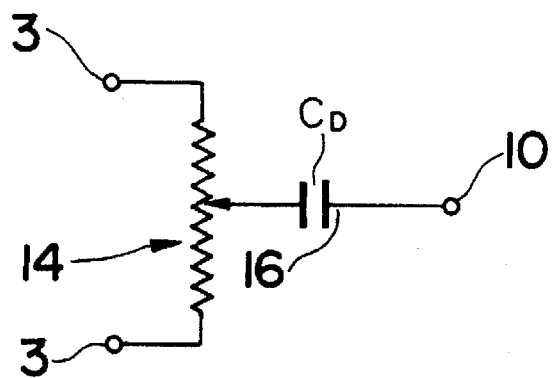
FIG. 6 is an equivalent circuit diagram of the potentiometer in FIG. 5.

A rotational shaft 4, which pivotally extends through the base 2, is located at the central portion of the resistor member 14 via a bearing 5, and a bent electrode arm 15 is attached to the rotational shaft 4. A movable electrode 16 consisting of a conductor is integrally formed on the end portion of the electrode arm 15. The movable electrode 16 is arranged to oppose to the resistor member 14 to have a small gap therebetween, and the gap between the movable member 16 and the resistor member 14 serves as a resistance dividing capacitor $C_D$ shown in FIG. 6. Note that the electrode arm 15 is connected to an output terminal 10 via the rotational shaft 4 as a conductor or connection means such as a wire or the like.

Therefore, in this potentiometer, when an AC current is flowed between the two terminals of the resistor member 14 via the input terminals 3,3, an AC potential is generated on the resistor member 14, and an AC potential which is attenuated by a predetermined amount is also generated on the movable electrode 16 which is capacitively coupled to the resistor member 14. At this time, when the movable electrode 16 slides together with the rotational shaft 4, since a change in AC potential proportional to the potential difference from the resistor member 14 occurs on the movable electrode 16, the rotational position of the rotational shaft 4 can be determined by detecting the AC output from the movable electrode 16.

In the potentiometer of this embodiment, since the movable electrode 16 and the resistor member 14 are AC-electrically conducted to each other via the capacitor $C_D$ as an impedance element formed by these two members, the movable electrode 16 serves as a pseudo brush corresponding to the brush 7 in the conventional contact type potentiometer.

According to this embodiment, since the movable electrode 16 and the fixed resistor member 14 do not mechanically contact each other, a potentiometer free from wear of these members can be realized. In this embodiment, since the output from the potentiometer becomes the dividing ratio of the AC voltage corresponding to the dividing ratio of the resistance, a detection error caused by a change in resistance of the resistor member 14 due to a change in temperature can be ignored. Although another error occurs depending on a change in dielectric constant of the capacitor $C_D$ caused by a change in temperature, since the dielectric constant of air undergoes almost no change due to a change in temperature in practice, a stable output can be consequently obtained.

Figure 8:
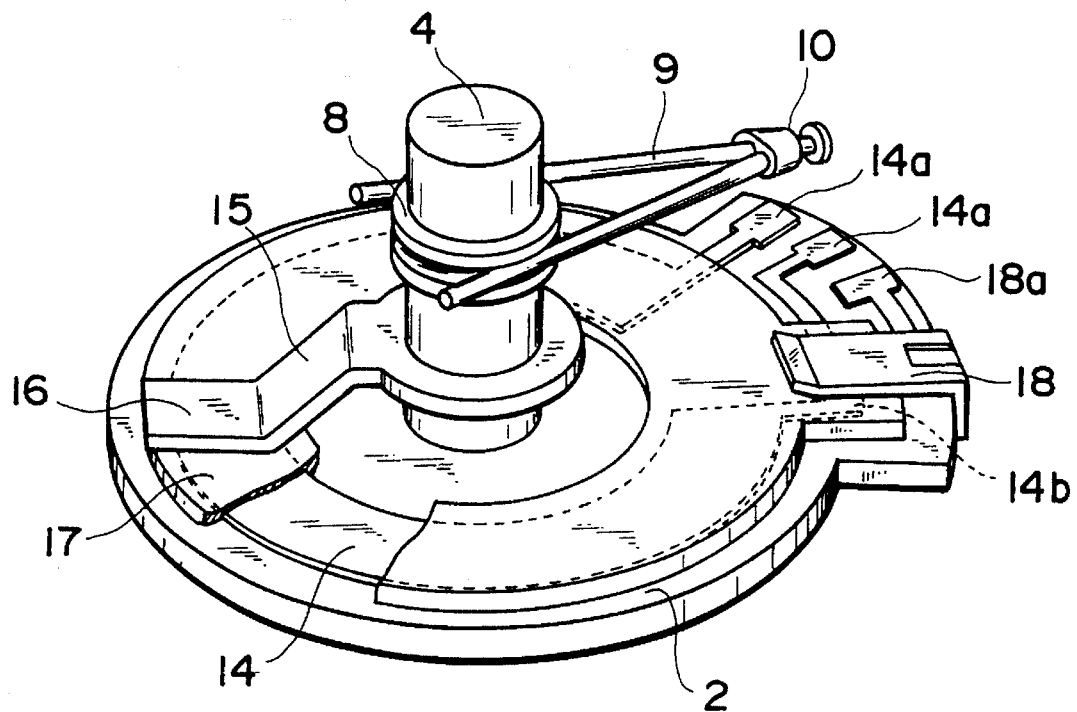
FIG. 8 is a perspective view showing a potentiometer according to the second embodiment of the present invention.
Figure 9:
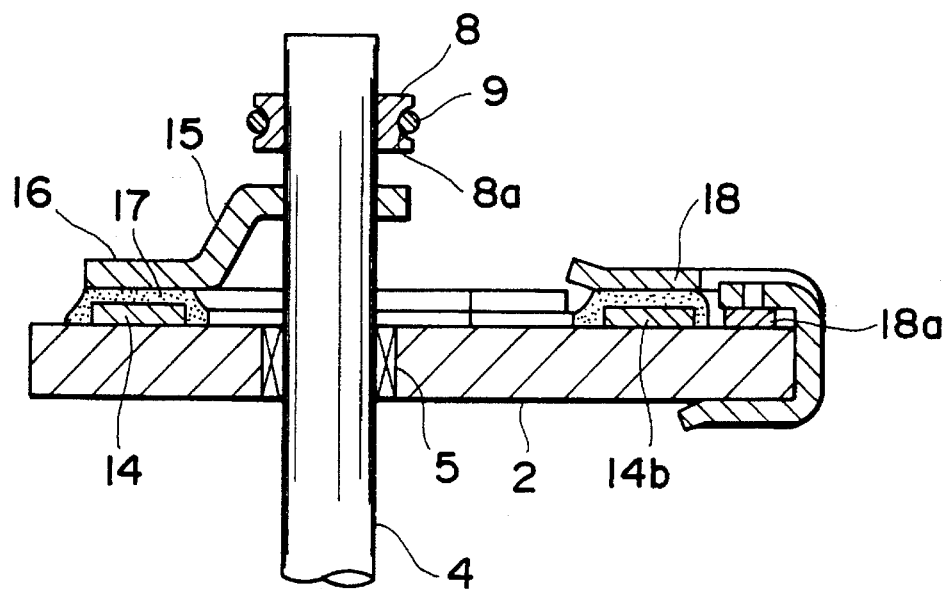
FIG. 9 is a partial sectional view of the potentiometer in FIG. 8.
Figure 10:
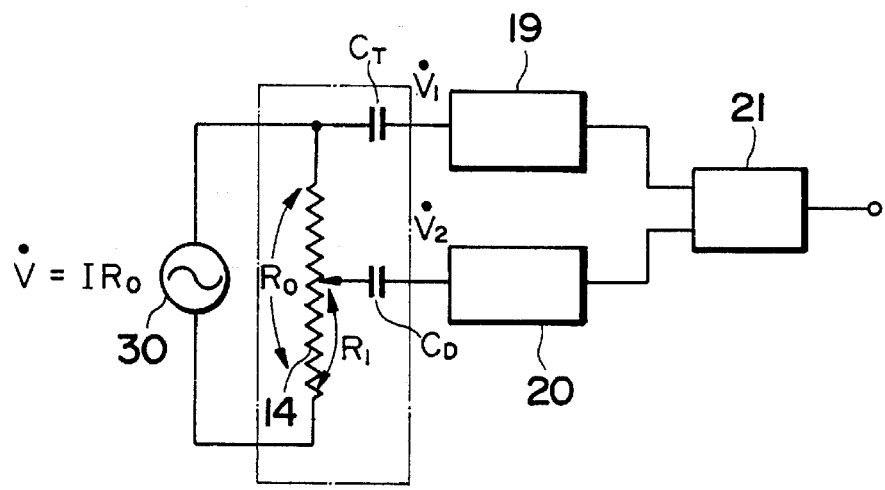
FIG. 10 is an equivalent circuit diagram of the potentiometer in FIG. 8.

The second embodiment shown in FIGS. 8 to 10 corresponds to an improvement of the first embodiment. In this potentiometer, an insulator layer. 17 of a uniform thickness is overlaid on the upper surface of a resistor member 14, and a movable electrode 16 slidably moves along the surface of the insulator layer 17. For this reason, since the constant interval between the movable electrode 16 and the resistor member 14 is maintained, and the interval makes the capacitance of a capacitor $C_D$ constant, there is no fear of a detection error caused by a change in interval due to a cluttering between the movable electrode 16 and the resistor member 14.

The second embodiment will be described in detail below with reference to the corresponding figures. The resistor member 14 consisting of an annular resistor material having two non-contact ends is overlaid and fixed on the upper surface of a substantially circular base 2, and the insulator layer 17 of a uniform thickness is overlaid and fixed on the upper surface of the resistor member 14. A rotational shaft 4 is inserted in the base 2 via a bearing 5 at the central position of the resistor member 14, and the proximal end portion of a bent electrode arm 15 is fitted on and fixed to the rotational shaft 4.

The movable electrode 16 consisting of a conductor is integrally formed at the distal end of the electrode arm 15. The movable electrode 16 is arranged to be in contact with the surface of the insulator layer 17, and slides along the upper surface of the insulator layer 17 upon rotation of the rotational shaft 4. If resiliency for biasing the movable electrode 16 in a direction of the base 2 is given to the electrode arm 15, no gap is formed between the movable electrode 16 and the insulator layer 17. A slip ring 8, which is electrically connected to the electrode arm 15 and has a U-shaped section in the radial direction, is fitted on the rotational shaft 4, and a recess groove 8a on the outer circumferential surface of the slip ring 8 is slidably clamped by a V-shaped output conductive wire 9.

The base 2 which mounts the resistor member 14 has a stationary electrode 18 in addition to the movable electrode 16. The stationary electrode 18 is mounted to oppose one end portion 14b of the resistor member 14, and is arranged to be in contact with the upper surface of the insulator layer 17 in the same manner as the movable electrode 16. The stationary electrode 18 solves a problem caused by inserting the insulator layer 17 between the resistor member 14 and the movable electrode 16.

More specifically, the insulator layer 17 is arranged between the movable electrode 16 and the resistor member 14 to serve as a spacer, and maintains a predetermined interval between the movable electrode 16 of the rotational shaft 4 and the resistor member 14, thereby improving detection precision. However, when the insulator layer 17 is used, the interval defined by the insulator layer changes due to expansion/shrinkage of its material due to a change in temperature of the insulator layer 17, and the dielectric constant of the insulator layer 17 changes due to a change in temperature, thus causing an error in detection precision.

Thus, in this embodiment, the stationary electrode 18 is provided in addition to the movable electrode 16 so as to correct the position detection output of the potentiometer by detecting the error. More specifically, a temperature compensation capacitor $C_T$ having a capacitance equal to that of the capacitor $C_D$ is formed between the stationary electrode 18 and one end portion 14b of the resistor member 14 in addition to the resistance dividing capacitor $C_D$ formed between the movable electrode 16 and the resistor member 14, and a change in capacitance due to a change in temperature of the insulator layer 17 is detected based on the output from the capacitor $C_T$, thereby compensating for the influence of the temperature in a circuit manner.

The operation of the potentiometer according to this embodiment will be described below.

When an AC power supply 30 is connected to input terminals 14a.14a of the resistor member 14, as shown in FIG. 10, and a current is flowed, attenuated voltages are obtained on the movable electrode 16 and the stationary electrode 18 due to capacitive coupling with the resistor member 14. In this case, a potential difference of a predetermined amplitude is generated between the movable electrode 16 and the resistor member 14 which constitute the resistance dividing capacitor $C_D$. This potential difference increases/decreases in proportion to the position of the movable electrode 16, and the potential on the movable electrode 16 changes in proportion to the increase/decrease in potential difference. Therefore, when the output from the movable electrode 16 provided to the rotational shaft 4 is measured, the rotational angle or the displacement amount of the rotational shaft 4 can be detected.

Assuming that the dielectric constant between the resistor member 14 and the movable electrode 16 changes due to a disturbance such as a change in temperature, since this change inevitably becomes a detection error, it must be compensated for in a circuit manner. Thus, as shown in FIG. 10, voltage measurement devices 19 and 20 are respectively connected to the movable electrode 16 and the stationary electrode 18, and the output signals from the voltage measurement devices 19 and 20 are input to an arithmetic processing device 21.

If the voltage of the AC power supply 30 is represented by V, the input current is represented by I, the resistance of the resistor member 14 is represented by $R_0$, the resistance between the movable electrode 16 and the resistor member 14 is represented by $R_1$, the output from the resistance dividing capacitor $C_D$ is represented by $V_2$, and the output from the temperature compensation capacitor $C_T$ is represented by $V_1$, we have:

$$V = IR_0, \quad (1)$$

$$V_1 = 1/j\omega C_T \cdot I \quad (2)$$

$$V_2 = R_1/R_0 (1/j\omega C_D \cdot I) \quad (3)$$

If $$c_T = C_d \quad (4)$$

then $$V_2 = (R_1/R_0) V_1 \quad (5)$$

As can be seen from equations (4) and (5), if $C_T = C_D$ is established, the ratio between the outputs $V_1$ and $V_2$ is determined by only the voltage dividing ratio $R_1/R_0$ of the resistor member 14. Even when the insulator layer 17 which determines the capacitances of the capacitors $C_T$ and $C_D$ are suffered from a change in temperature, changes in capacitance due to a change in temperature are equal to each other in the two capacitors. Therefore, the relationship $C_T = C_D$ is left unchanged even when the temperature changes. Even when the resistor member 14 is suffered from a change in temperature, its voltage dividing ratio $R_1/R_0$ remains the same. Therefore, the relationship given by equation (5):

$$V_2 = (R_1/R_0)V_1$$

is not influenced by the change in temperature. Note that when the input current I from the AC power supply 30 changes, the outputs $V_1$ and $V_2$ change, but these changes can be canceled by calculating:

$$V_2/V_0$$

in, e.g., an arithmetic processing circuit at the output side. As a result, a potentiometer which is not influenced by a change in temperature at all in principle can be obtained.

In the above-mentioned case, as the simplest means for setting $C_T = C_D$, the movable electrode 16 and the stationary electrode 18 may be set to have an equal area, and the distances between the electrodes 16 and 18, and the resistor member 14 and its one end portion 14b may be set to be equal to each other.

The characteristics of the capacitors $C_T$ and $C_D$ respectively formed by the stationary electrode 18 and the resistor member's one end portion 14b, and by the movable electrode 16 and the resistor member 14 will be described below. An impedance Z formed by the resistor member 14 and one of the electrodes 16 or 18 is given by:

$$Z = 1/j\omega C = L/j\epsilon_0\epsilon_s S \qquad (6)$$

for $\omega = 2\pi f$ where C is the capacitance ($C = C_D = C_T$) of the capacitors $C_T$ and $C_D$, f is the oscillation frequency of the AC power supply, $\epsilon_s$ is the relative dielectric constant of the insulator layer 17, $e_0$ is the dielectric constant of vacuum, S is the area of either the electrode 16 or 18, and L is the interval between the resistor member 14 and one of the electrodes 16 and 18.

As can be seen from equation (6), a decrease in impedance Z can be attained by the following three methods so as to improve the sensitivity of the potentiometer. The first method is to increase the oscillation frequency f of the AC power supply 30, the second method is to use a material having a high induction constant $\epsilon_s$ as the insulator layer 17, and the third method is to decrease the thickness of the insulator layer 17. As for the first method, when the oscillation frequency f is increased too much, since the induction components of the electrode arm 15 and the conductive wire 9 increase, the power supply 30 is preferably driven within a range from several tens of Hz to several hundreds of Hz. The second method is not adopted in this embodiment since no water absorbency of the material of the insulator layer 17 and a small coefficient of friction must also be considered. For this reason, the sensitivity is improved by exclusively using the third method, i.e., by decreasing the thickness of the insulator layer 17.

Furthermore, it is preferable that the electrode arm 15 be bent in a direction of the base 2 at its distal end side, and this bent portion and the movable electrode 16 form a right angle. This is because if the resistor member 14 is present at a portion facing the electrode arm 15, a stray capacitance is generated between these portions, and the linearity of an output is impaired.

Figure 11:
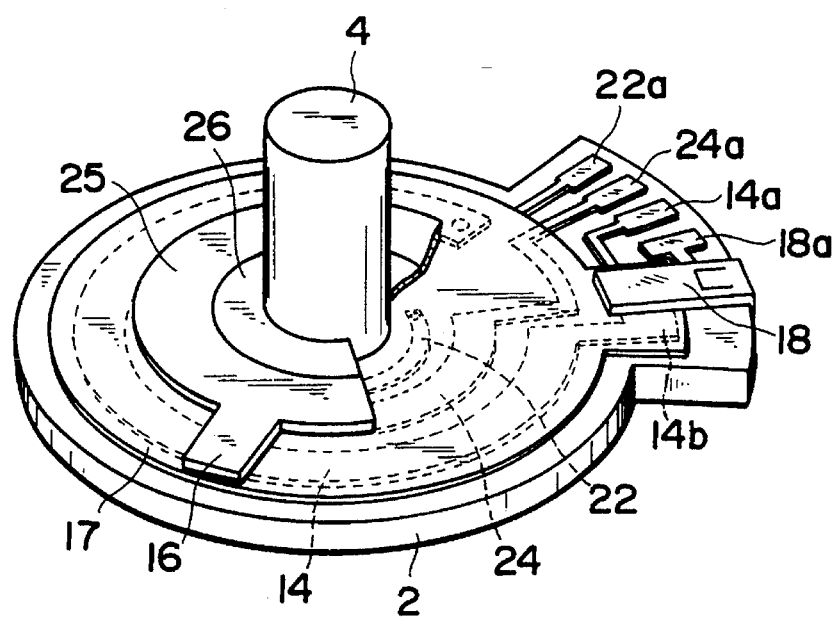
FIG. 11 is a perspective view showing a potentiometer according to the third embodiment of the present invention.
Figure 12:
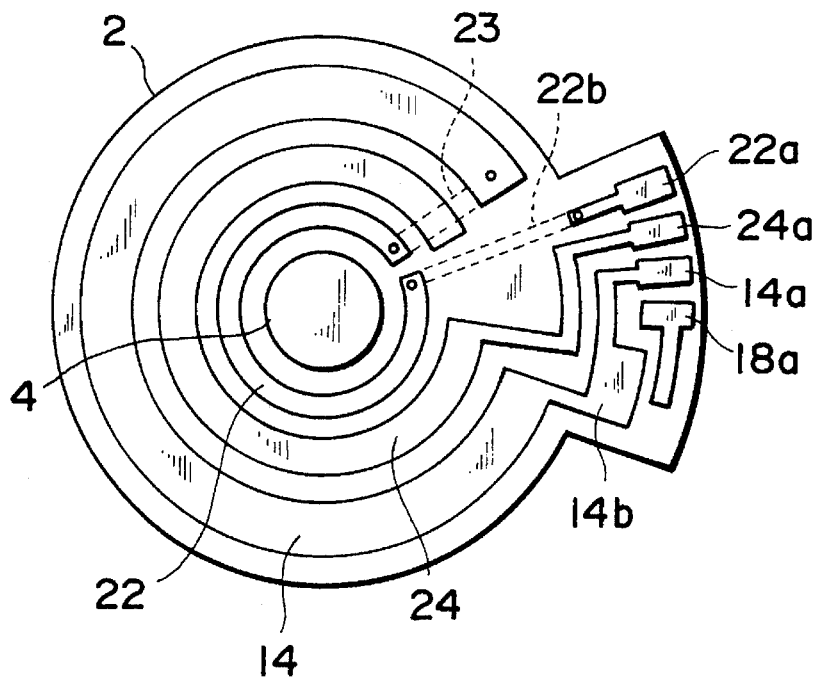
FIG. 12 is a plan view showing a circuit pattern in FIG. 11.
Figure 13:
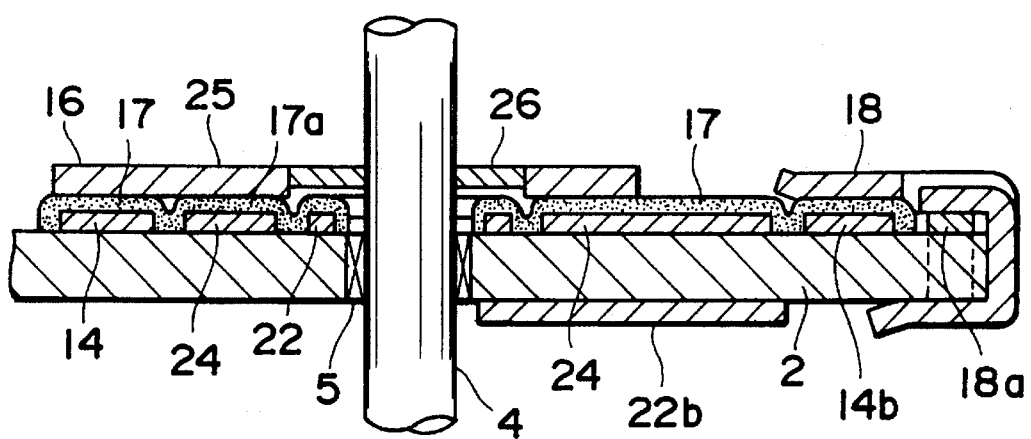
FIG. 13 is a longitudinal sectional view of FIG. 11.

As shown in FIGS. 11 to 13, in the third embodiment, a detection line for extracting an AC output of a movable electrode 16 is realized by a structure without any contact portion using an output pattern 24 and an annular electrode 25 (to be described later). In this embodiment, an annular resistor member 14 having two non-contact ends is overlaid on the upper surface of a base 2 as an insulating support member, and input terminals of an AC power supply 30 are respectively connected to two end portions 222, 14a of the conductor 22 and resistor member 14. An insulator layer 17 of a uniform thickness is overlaid on the upper surface of the resistor member 14.

Inside of the resistor member 14, a conductor 22 having two open ends is arranged in parallel with the resistor member 14. One end of the resistor member 14 and one end of the conductor 22 are conducted by a connection lead wire 23, and the resistor member 14 and the conductor 22 form a resistance dividing pattern. The other end of the conductor 22 is connected to an input terminal portion 22a via a connection lead wire 22b. An output pattern 24 consisting of a conductor having two open ends is arranged between the resistor member 14 and the conductor 22 to be parallel to these members, and an output terminal 24a is provided to one end portion of the pattern 24. A rotational shaft 4, which pivotally extends through the base 2 via a bearing 5, is located at the central portion of the resistor member 14, the conductor 22, and the output pattern 24. An annular electrode 25 is mounted on the rotational shaft 4 via an insulator layer 26, and a movable electrode 16 is formed to project from the peripheral edge of the annular electrode 25. The movable electrode 16 is arranged to oppose to the resistor member 14, and to be slidably movable along the insulator layer 17 adhered on the upper surface of the resistor member 14, and the movable electrode 16 and the resistor member 14 form a resistance dividing capacitor $C_D$. Furthermore, the annular electrode 25 is arranged to oppose to the output pattern 24 and to be slidably movable along an insulator layer 17a adhered on the output pattern 24, and an output capacitor $C_O$ is formed between the annular electrode 25 and the output pattern 24.

According to this embodiment, when an AC current is supplied to the input terminal portions 14a.14a of the resistor member 14, a potential is generated on the resistor member, and a potential attenuated by a predetermined amount is also generated on the movable electrode 16. At this time, when the movable electrode 16 is slid together with the rotational shaft 4, since the potential on the movable electrode 16 changes in proportion to the potential difference between the movable electrode 16 and the resistor member 14, the rotational position of the rotational shaft 4 can be detected by detecting the output from the movable electrode 16.

The AC voltage divided output obtained from the movable electrode 16 constituting the resistance dividing capacitor $C_D$ can be supplied to the output pattern 24 via the output capacitor $C_O$, and can be extracted from the output terminal portion 24a of the output pattern 24, thus realizing a detector without any electrical contact portions. Since the annular electrode 25 and the output pattern 24 oppose to each other in a large area, the output capacitor $C_O$ has a sufficiently low impedance in an AC manner, and hence, a good signal output can be obtained.

In the above-mentioned case, when an AC current is supplied to the resistor member 14, an induction current is generated in the adjacent output pattern 24, and an error is undesirably generated in a detection output. However, in this embodiment, the conductor 22 electrically connected to the resistor member 14 is arranged aside the output pattern 24, and a current in a direction opposite to that of the current flowing through the resistor member 14 (i.e., a current of the opposite phase) flows through the conductor member 22. For this reason, an opposite-phase induction current is generated from the conductor 22 to the output pattern 24, and as a result, the induction current generated in the output pattern 24 is canceled, thus causing no error in the detection output.

Furthermore, in this embodiment, a stationary electrode 18 is provided to the base 2. The stationary electrode 18 is arranged to oppose one end portion 14b of the resistor member 14 at a predetermined interval to constitute a temperature compensation capacitor $C_T$, so that the output from the stationary electrode 18 can be extracted from an electrode terminal portion 18a. The temperature compensation capacitor $C_T$ is equivalent to that in the second embodiment, and can provide the following effects.

More specifically, when the insulator layer 17, which is provided to reliably hold the interval between the movable electrode 16 and the resistor member 14, expands or shrinks due to a disturbance such as a change in temperature or the like, and the dielectric constant changes, an error is generated in a voltage value to be detected from the movable electrode 16. The disturbance caused by the change in temperature or the like is an in-phase disturbance, and the change in dielectric constant occurring in the insulator layer 17 immediately under the movable electrode 16 similarly occurs in that immediately under the stationary electrode 18. Therefore, the output from the stationary electrode 18 and the output from the movable electrode 16 are input to an arithmetic processing circuit, and output voltage ratios are calculated as in, e.g., the second embodiment, thereby compensating for the error in a circuit manner.

Figure 14:
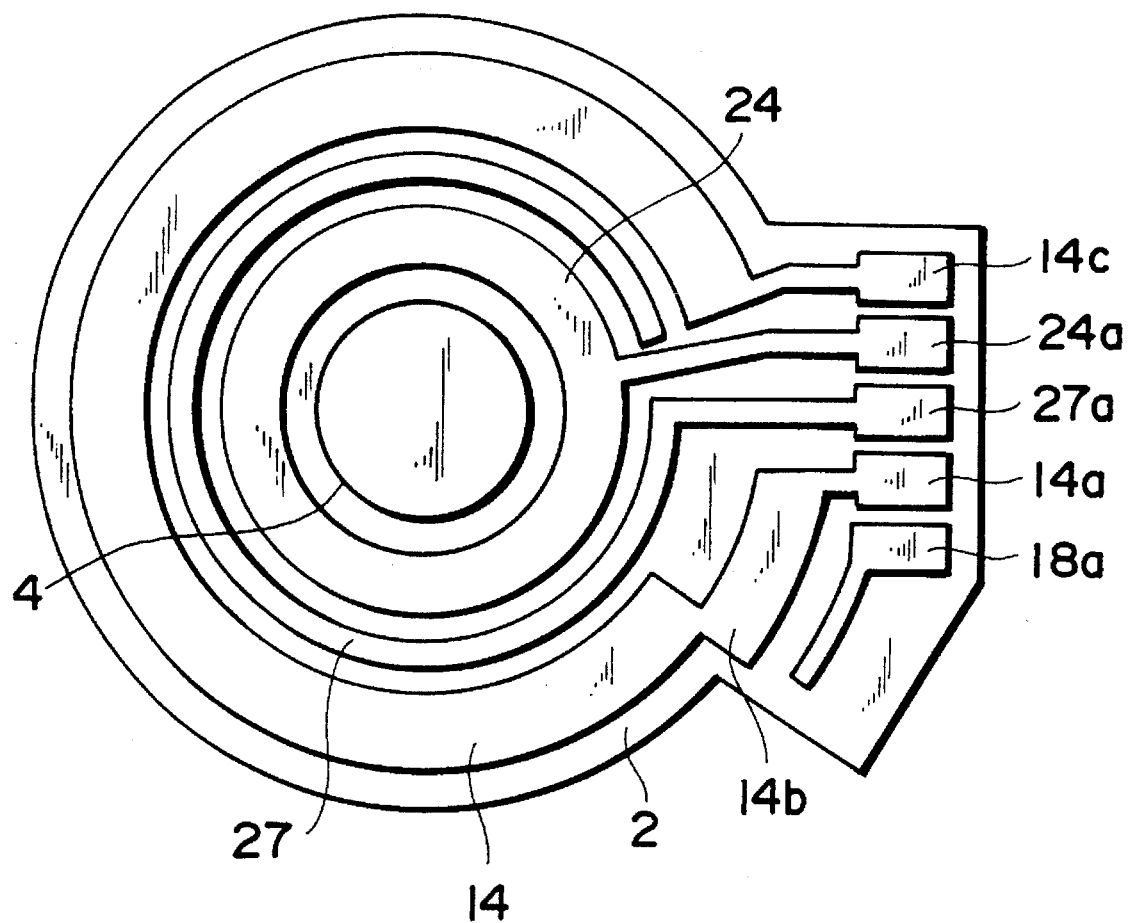
FIG. 14 is a plan view showing a circuit pattern of a potentiometer according to the fourth embodiment of the present invention.

In the fourth embodiment shown in FIG. 14, a large-diameter resistor member 14 and a small-diameter output pattern 24 are adhered on the upper surface of a base 2, and a guard line 27 is adhered between the resistor member 14 and the output pattern 24.

The resistor member 14 is basically designed to have substantially the same structure as that described in the third embodiment, except that one end portion 14c of the resistor member is elongated and bent to substantially the same position as that of the other end portion 14a. The above-mentioned output pattern 24 is formed in an annular shape, and its portion is elongated and extends outwardly. An output terminal 24a is formed on the elongated end portion. Furthermore, the guard line 27 is formed in a substantially C shape, and its one end portion is elongated and bent. This elongated end portion 27a is inserted between the end portion 14a of the resistor member 14 and the output terminal portion 24a. If the guard line 27 is not formed, an induction current is generated on the output pattern 24 when an AC current is applied across the two ends 14a and 14c of the resistor member 14. For this reason, in this embodiment, as described above, the pattern of the guard line 27 is formed between the resistor member 14 and the output pattern 24, and is grounded (GND). With this arrangement, since the induction current flows to the guard line 27 of a low potential, the influence on the output can be prevented.

Other portions have the same arrangements as those of the third embodiment. More specifically, an annular electrode is attached to a rotational shaft via an insulator layer, and the annular electrode and the output pattern 24 form a low-impedance output capacitor $C_O$ therebetween. A movable electrode projecting from the annular electrode and the resistor member 14 form a resistance dividing capacitor $C_D$ therebetween, and the portion 14a of the resistor member 14 and a stationary electrode facing this portion form a temperature compensation capacitor $C_T$. The output of this capacitor $C_T$ is extracted from a terminal 18a contacting the output electrode.

Figure 15:
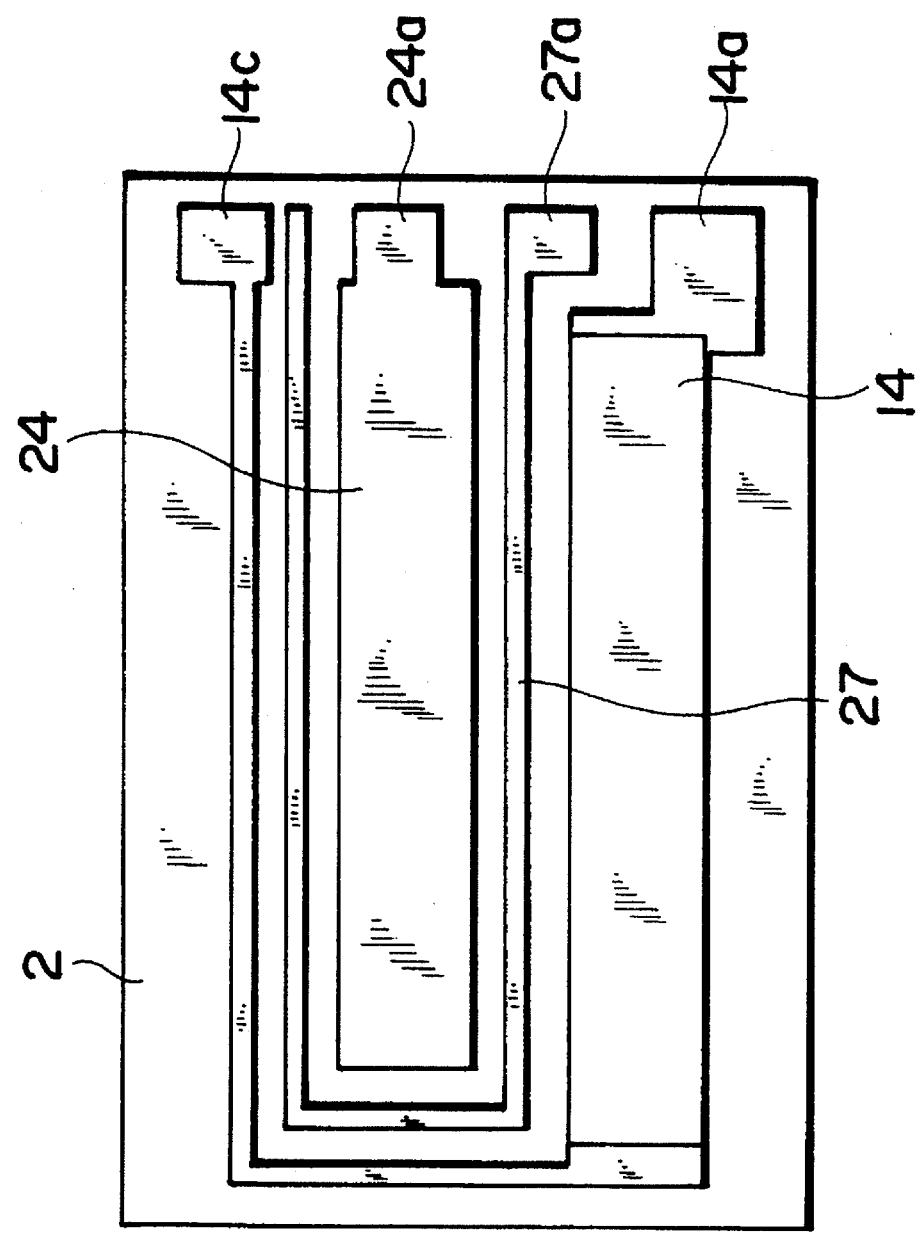
FIG. 15 is a plan view showing a circuit pattern of a potentiometer according to the fifth embodiment of the present invention.
Figure 16:
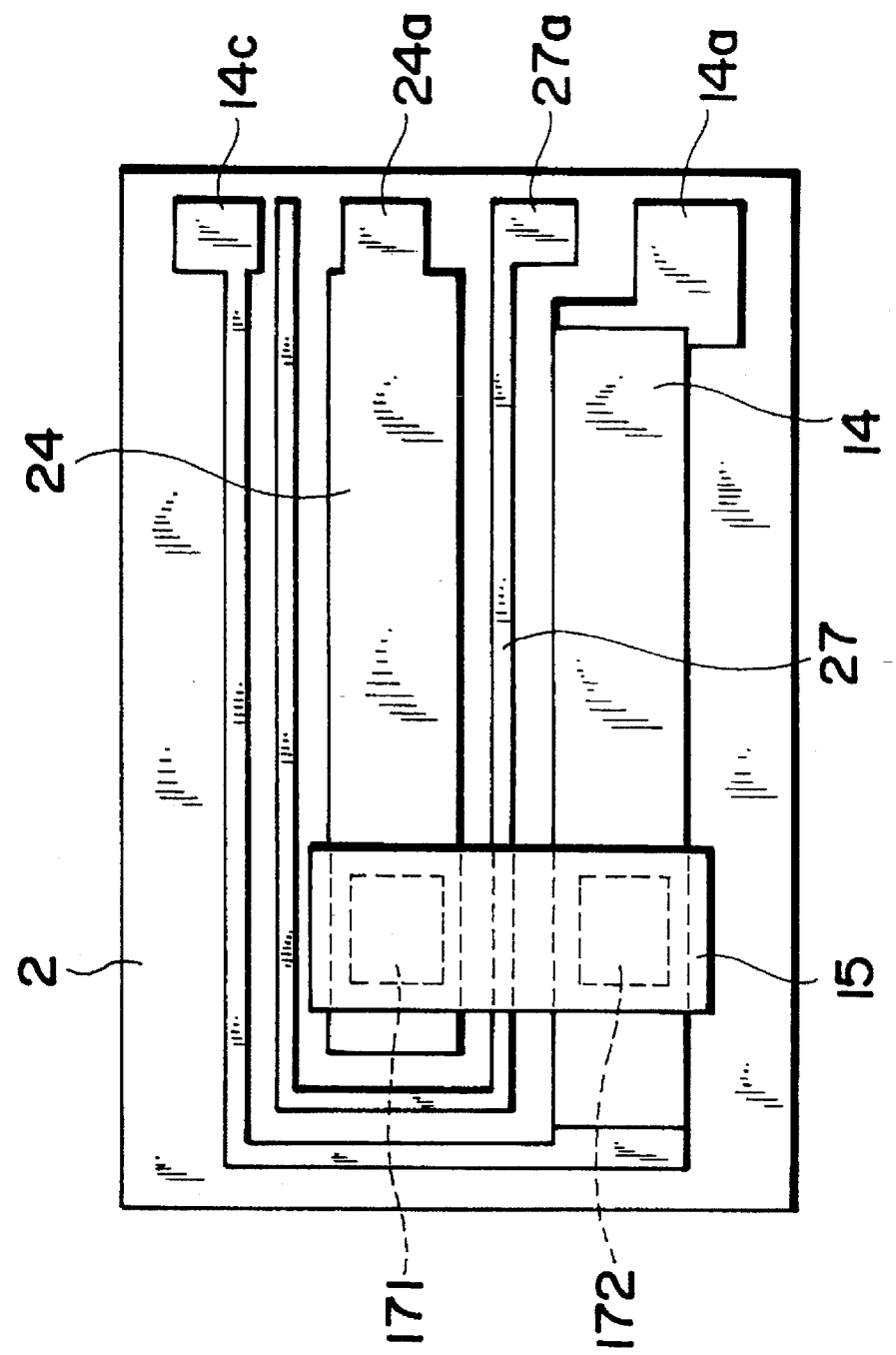
FIG. 16 is a plan view showing the positional relationship between the circuit pattern in FIG. 15 and a movable electrode.
Figure 17:
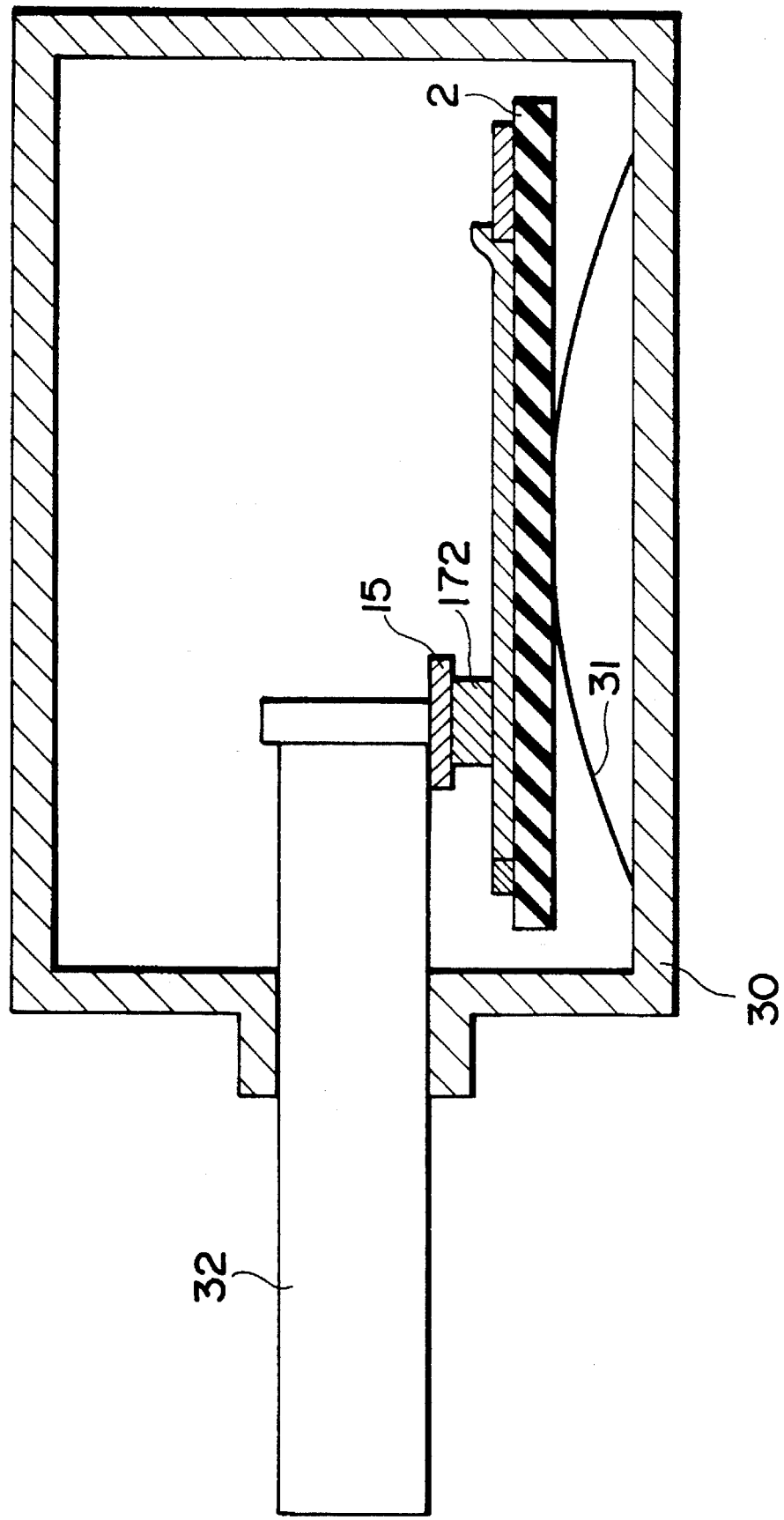
FIG. 17 is a sectional view showing a side arrangement of the fifth embodiment.
Figure 18:
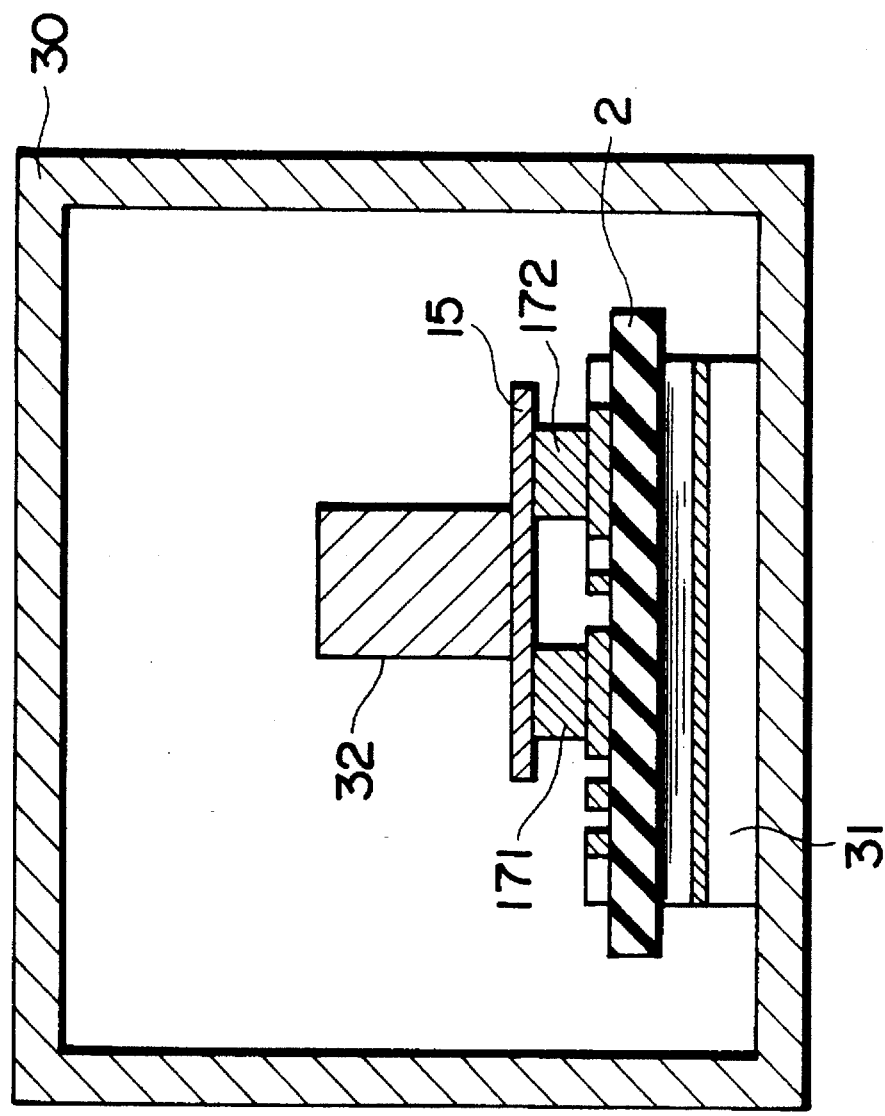
FIG. 18 is a sectional view showing a front arrangement of the fifth embodiment.

In each of the above embodiments, the resistor member 14 is formed into an annular shape, the movable electrode 16 is attached to the rotational shaft 4, and the potentiometer detects the rotational angle or rotational displacement amount of the rotational shaft 4. However, the present invention is not limited to this. For example, as shown in FIG. 15, the resistor member 14 may be formed into a rectangular shape, and as shown in FIG. 16, the movable electrode 16 is slid along a linear portion, in the longitudinal direction, of the resistor member 16, thereby constituting a potentiometer which detects a linear displacement amount from AC outputs from the terminals 14a and 14c. As shown in FIGS. 17 and 18, the base 2 is supported on a box 30 by a leaf spring 31, and a movable electrode 15 is supported on the distal end of a slide rod 32. The movable electrode 15 and an output electrode 151 are constituted by a single plate, and insulator layers 171 and 172 are adhered to the lower surface of the plate. The insulator layer 17 for holding the interval between the movable electrode 16 and the resistor member 14 may be fixed at the side of the movable electrode 16 in place of the side of the resistor member 14, or may be fixed on both the sides of the resistor member 14 and the movable electrode 16. In addition, the arrangements, shapes, and the like of the electrodes 16 and 18, the resistor member 14, the conductor 22, and the output pattern 24 may be properly changed as needed.

INDUSTRIAL APPLICABILITY

As described above, according to the present invention, since a non-contact detection portion is used, the detection portion does not suffer from any mechanical deterioration, and a long service life of a potentiometer can be realized while maintaining high detection precision over a long period of time.

Although the non-contact detection portion is used, it is not of a magnetic type, and hence, problems of magnetic characteristic deterioration due to a change over time of a permanent magnet, a decrease in detection precision caused by the deteriorated magnetic characteristics, and the like are not posed at all unlike in a conventional non-contact potentiometer using magnetism.

Since no magnetism is used, temperature characteristics are very high, and the potentiometer can be used in a wide temperature range. Also, since a detection current extraction portion is also realized in a non-contact manner, the current extraction portion does not suffer from any mechanical deterioration, and an output terminal need only to be connected to an output pattern facing to an electrode. For this reason, the current extraction portion can be two-dimensionally constituted as compared to a sliding contact type, and the size of the potentiometer can be remarkably reduced.

Furthermore, since a detection current can be extracted by a resistance dividing capacitor and a temperature compensation capacitor, a detection error caused by a change in insulator layer due to a change in temperature can be compensated for in a circuit manner by detecting the output ratio between these capacitors as a measurement value.

What is claimed is:

1. A potentiometer comprising:

a resistor member having two ends to which a predetermined AC input voltage is applied;

a movable electrode located along said resistor member between the two ends, said movable electrode facing said resistor member and separated by a predetermined interval therefrom;

an insulator layer of a uniform thickness inserted between said resistor member and said movable electrode; and an AC output voltage corresponding to a dividing ratio of said resistor member divided by said movable electrode, said AC output voltage being output from said movable electrode via a resistance dividing capacitor formed by said movable electrode and said resistor member facing said movable electrode.

2. A potentiometer according to claim 1, further comprising:

a first stationary electrode connected to one of the two ends of said resistor member;

a second stationary electrode facing said first stationary electrode and separated by a predetermined interval therefrom to form a temperature compensation capacitor having the same capacitance as the resistance dividing capacitor; and compensation arithmetic means for calculating and outputting a signal indicating a temperature-compensated position of said movable electrode by using said AC output voltage output from said movable electrode and an AC second output voltage output from said second stationary electrode.

3. A potentiometer according to claim 1, wherein said resistor member is formed in an arcuated shape or an annular shape having two non-contact ends.

4. A potentiometer according to claim 1, wherein said resistor member is formed in a linear shape.

5. A potentiometer according to claim 2, wherein said first stationary electrode is constituted by a portion of said resistor member.

6. A potentiometer comprising:

a resistor member having two ends to which a predetermined AC input voltage is applied;

a movable electrode located along said resistor member between the two ends, said movable electrode facing said resistor member and separated by a predetermined interval therefrom;

a first output electrode fixed to said movable electrode and moving together with said movable electrode;

a second output electrode formed to extend in a moving direction of said movable electrode so as to oppose the first output electrode and be separated by a predetermined interval therefrom;

a first AC output voltage corresponding to a dividing ratio of said resistor member divided by said movable electrode, said first AC output voltage being output from said movable electrode via a resistance dividing capacitor formed by said movable electrode and said resistor member facing said movable electrode; and a second AC output voltage output from said movable electrode being extracted via an output capacitor formed by said first and second output electrodes.

7. A potentiometer according to claim 6, further comprising a conductive member located by the side of said second output electrode so that said second output electrode is located between the conductive member and the resistor member, one end of said conductive member being connected to one end of said resistor member, and another end of said conductive member being connected to an input terminal for the predetermined AC input voltage.

8. A potentiometer according to claim 6, further comprising a grounded conductive shield member located between said resistor member and said second output electrode.

9. A potentiometer according to claim 6, further comprising an insulator layer of an uniform thickness inserted between said resistor member and said movable electrode.

10. A potentiometer according to claim 6, further comprising:

a first stationary electrode connected to one of the two ends of said resistor members;

a second stationary electrode facing to said first stationary electrode to be separated by a predetermined interval thereform to form a temperature compensation capacitor having the same capacitance as the resistance dividing capacitor; and compensation arithmetic means for calculating and outputting a signal indicating a temperature-compensated position of said movable electrode by using said first AC output voltage output from said movable electrode and said second AC output voltage output from said second stationary electrode.

11. A potentiometer according to claim 10, wherein said first stationary electrode is constituted by a portion of said resistor member.

12. A potentiometer according to claim 6, wherein said resistor member is formed in an arcuated shape or an annular shape having two non-contact ends.

13. A potentiometer according to claim 6, wherein said resistor member is formed in a linear shape.

14. A potentiometer comprising:

a base consisting of an insulating material;

a resistor member formed on said base in an annular shape having two non-contact ends, the two ends of the resistor member being connected to input terminals for applying a predetermined AC input voltage;

a rotational shaft pivotally supported by said base, and located at substantially the center of said resistor member; and a support member having two ends, the first end of the support member being fixed to said rotational shaft to support a movable electrode at the second end of the support member, the movable electrode facing said resistor member and maintaining a predetermined interval therebetween, an AC output voltage, corresponding to a dividing ratio of said resistor member divided by said movable electrode in accordance with rotation of said rotational shaft, said AC output voltage being output from said movable electrode via a resistance dividing capacitor formed by said movable electrode and said resistor member facing said movable electrode.

15. A potentiometer according to claim 14, wherein said rotational shaft is supported by said base via a bearing.

16. A potentiometer according to claim 14, further comprising an insulator layer of a uniform thickness adhered on an upper surface of said resistor member, wherein said movable electrode slidably moves in contact with said insulator layer.

17. A potentiometer according to claim 14, further comprising an insulator layer of a uniform thickness adhered on a lower surface of said movable electrode, wherein said movable electrode slidably moves so as to contact with said resistor member via said insulator layer.

18. A potentiometer according to claim 14, wherein said support member comprises an electrode arm made of a conductive material, said potentiometer further comprising a conductive slip ring having a recess groove on an outer circumferential surface thereof which is fitted on said rotational shaft, and wherein said AC output voltage output from said movable electrode is extracted via a conductive wire which slidably contacts the recess groove.

19. A potentiometer according to claim 18, wherein a portion near a distal end of said electrode arm is bent in a direction of said base, and said movable electrode is supported on the distal end.

20. A potentiometer according to claim 14, further comprising a stationary electrode facing said resistor member near one of the two ends of said resistor member so as to be separated by predetermined interval therefrom and to form a temperature compensation capacitor having substantially the same capacitance as the resistance dividing capacitor.

21. A potentiometer according to claim 20, wherein the insulator layer inserted between said resistor member and said movable electrode is also inserted between said stationary electrode and said resistor member.

22. A potentiometer according to claim 14,
wherein said support member includes an annular first output electrode connected to said movable electrode connected to said movable electrode, said potentiometer further comprising an annular second output electrode formed on said base to oppose said first output electrode and be separated by a predetermined interval therefrom, and
said AC output voltage output from said movable electrode is extracted from said second output electrode via output capacitor formed by said first and second output electrodes.

23. A potentiometer according to claim 22, further comprising an insulator layer inserted between said first and second output electrodes.

24. A potentiometer according to claim 22, wherein an annular conductive pattern having two non-contact ends is formed on said base inside of said second output electrode, the first end of said annular conductive pattern is connected to one end portion of said resistor member, and the second end of said annular conductive pattern is connected to the input terminal for the predetermined AC input voltage.

25. A potentiometer according to claim 22, further comprising a grounded annular conductive shield pattern located between said second output electrode and said resistor member, the grounded annular conductive shield being formed on the base.

* * * * *